(12) United States Patent
Zhou et al.

(10) Patent No.: US 9,940,332 B1
(45) Date of Patent: Apr. 10, 2018

(54) STORAGE POOL-BACKED FILE SYSTEM EXPANSION

(71) Applicant: EMC Corporation, Hopkinton, MA (US)

(72) Inventors: Yingchao Zhou, Beijing (CN); William Davenport, Burlington, MA (US); Haijia Shen, Beijing (CN); Henry Fang, Beijing (CN); Jean-Pierre Bono, Westboro, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 164 days.

(21) Appl. No.: 14/317,931

(22) Filed: Jun. 27, 2014

(51) Int. Cl.
*G06F 17/30* (2006.01)

(52) U.S. Cl.
CPC .................. *G06F 17/30091* (2013.01)

(58) Field of Classification Search
CPC .................................................. G06F 17/30091
USPC .......................................................... 707/822
See application file for complete search history.

(56) References Cited

U.S. PATENT DOCUMENTS

| 7,631,155 B1 | 12/2009 | Bono et al. |
| 7,818,535 B1 | 10/2010 | Bono et al. |
| 8,086,652 B1 * | 12/2011 | Bisson .................. G06F 3/0608 707/823 |
| 8,407,265 B1 | 3/2013 | Scheer et al. |
| 8,725,691 B1 | 5/2014 | Natanzon |
| 9,047,169 B1 * | 6/2015 | Haase ..................... G06F 12/00 |
| 9,256,603 B1 | 2/2016 | Bono et al. |
| 2002/0103889 A1 | 8/2002 | Markson et al. |
| 2005/0114289 A1 * | 5/2005 | Fair ..................... G06F 12/0862 |
| 2007/0094378 A1 * | 4/2007 | Baldwin .............. G06F 3/0601 709/223 |
| 2009/0164536 A1 * | 6/2009 | Nasre .................... G06F 3/0611 |
| 2009/0228535 A1 * | 9/2009 | Rathi ..................... G06F 3/048 |
| 2013/0055249 A1 | 2/2013 | Vaghani et al. |
| 2013/0086585 A1 * | 4/2013 | Huang .................. G06F 9/5072 718/1 |
| 2015/0095383 A1 | 4/2015 | Zhai et al. |

* cited by examiner

*Primary Examiner* — Rehana Perveen
*Assistant Examiner* — Hicham Skhoun
(74) *Attorney, Agent, or Firm* — BainwoodHuang

(57) ABSTRACT

Described are methods, systems, and apparatus, including computer program products for expanding a storage pool-backed file system. A file system expansion trigger is detected. First reserved space in the storage pool is reserved. A LUN size attribute associated with a LUN underlying the file system is increased. A file system size attribute associated with the file system is increased. First data to write to the file system is received. In response to receiving the first data, an expansion result is determined, wherein the expansion result indicates whether to expand the LUN and the file system. If the expansion result indicates to expand the LUN and the file system, a first portion of the first reserved space is provisioned and formatted. The first data is written to the file system.

21 Claims, 12 Drawing Sheets

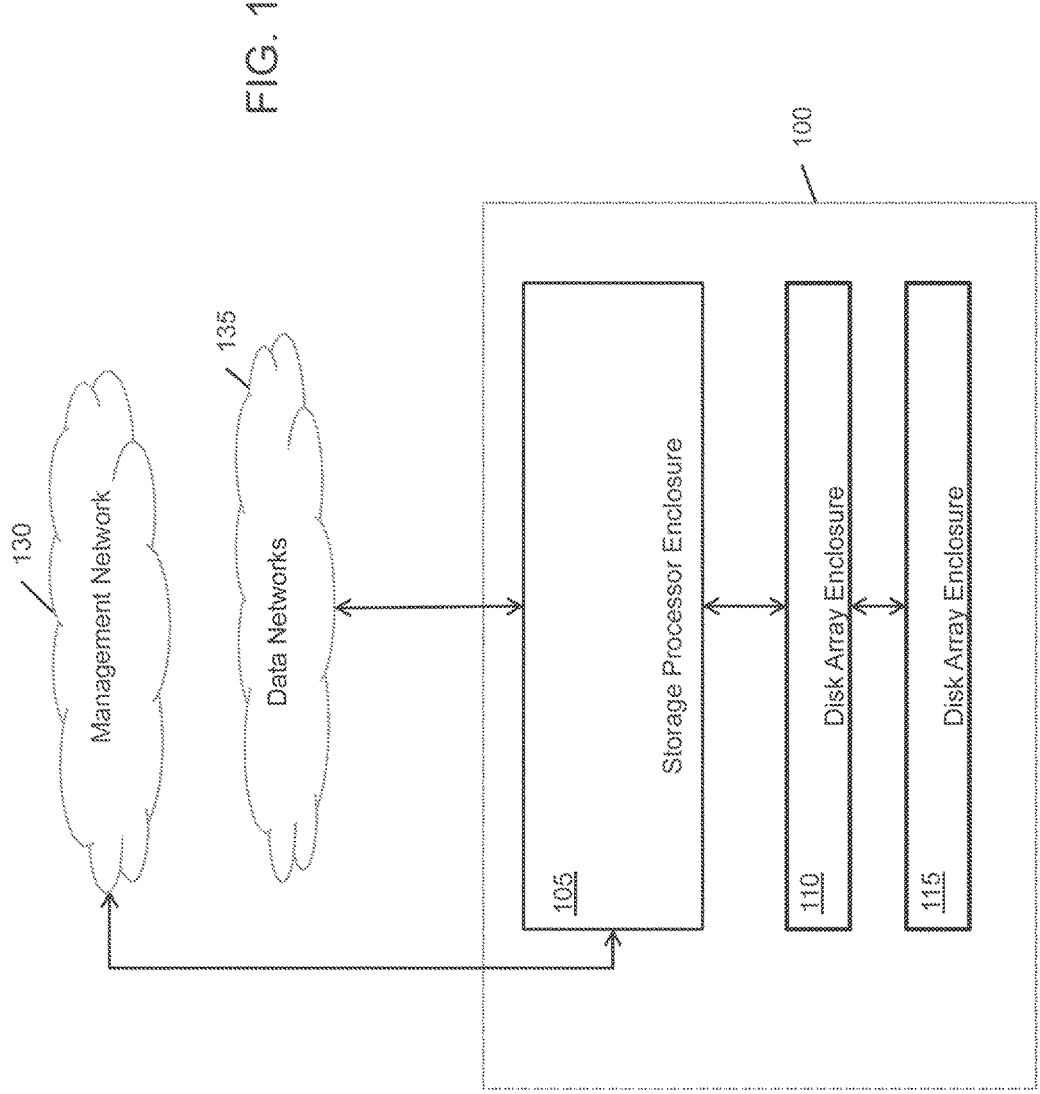

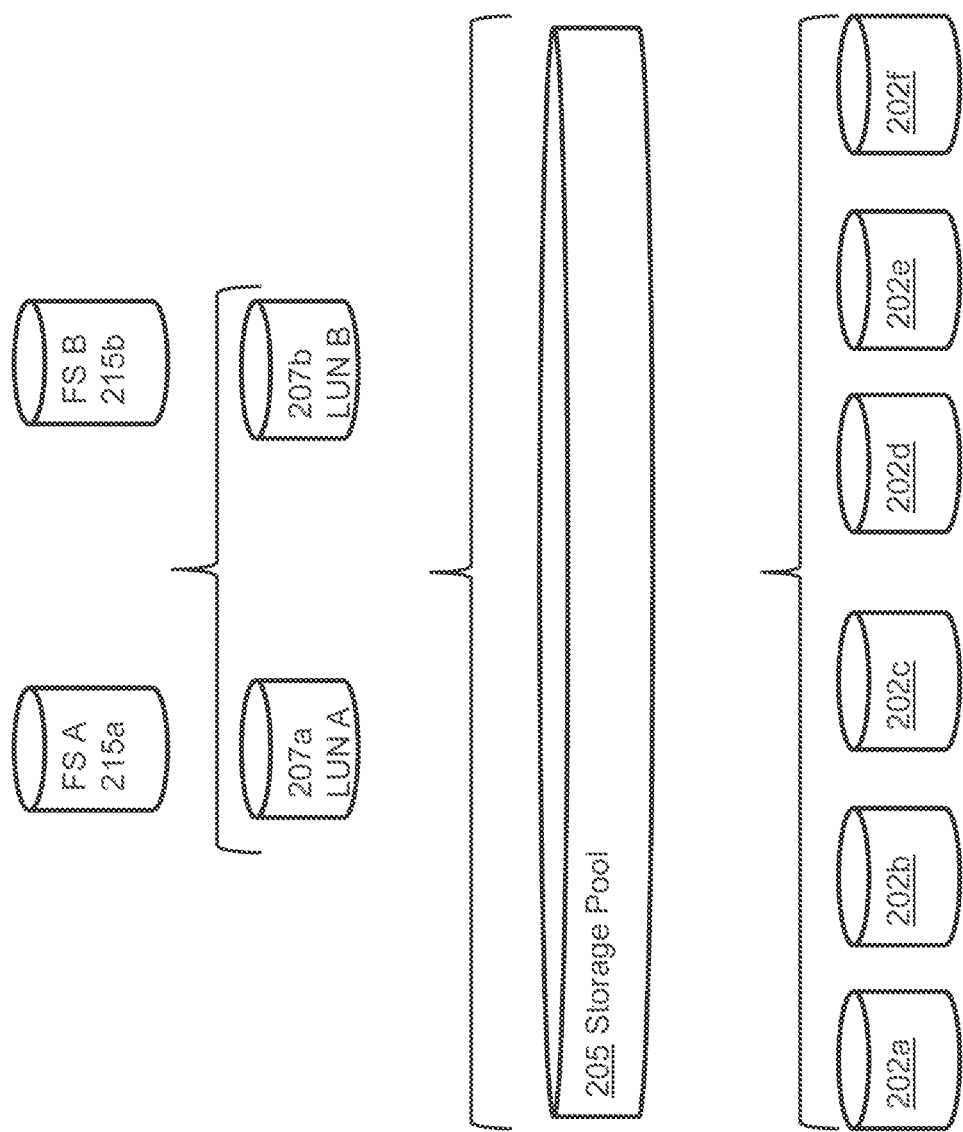

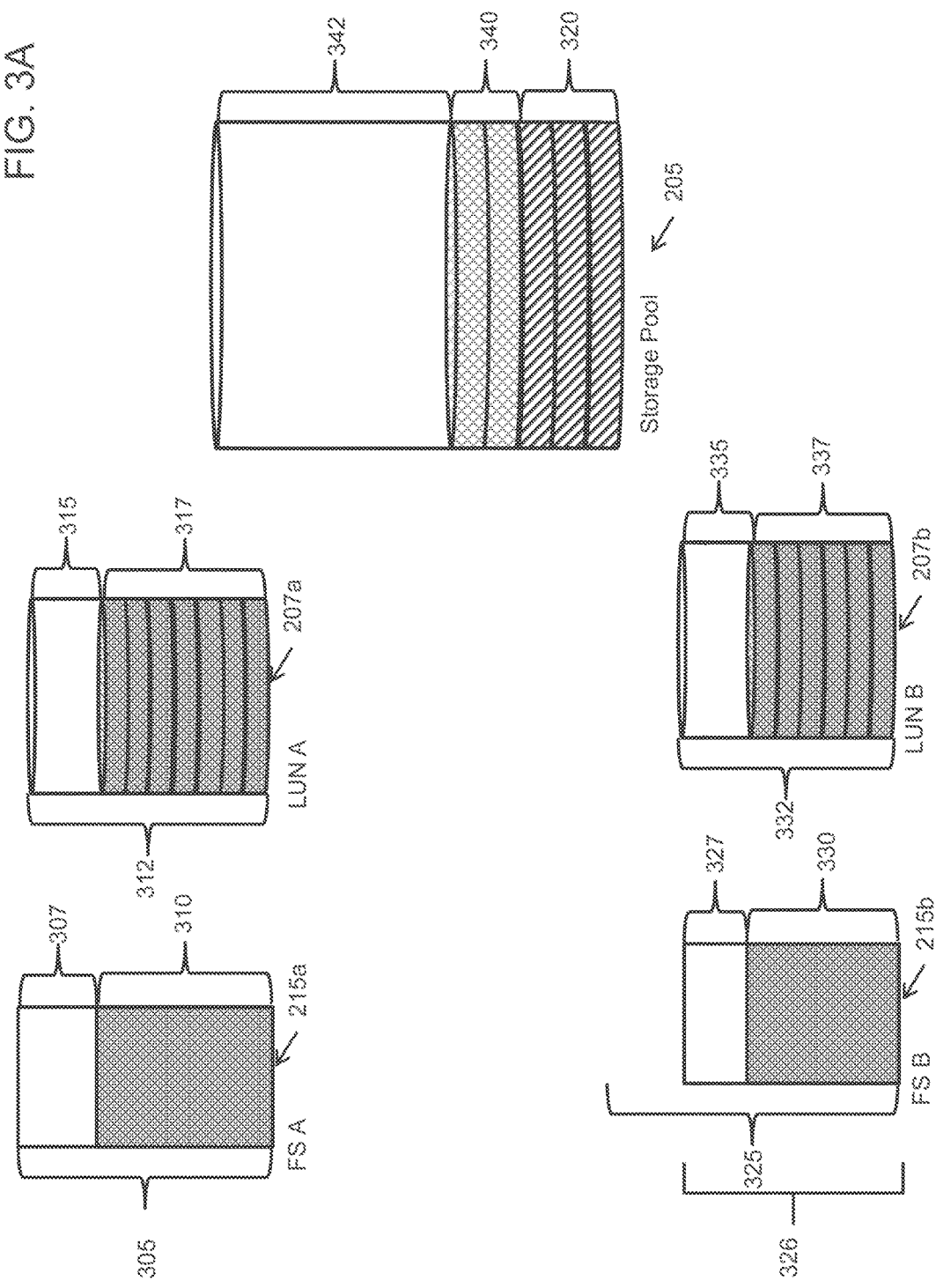

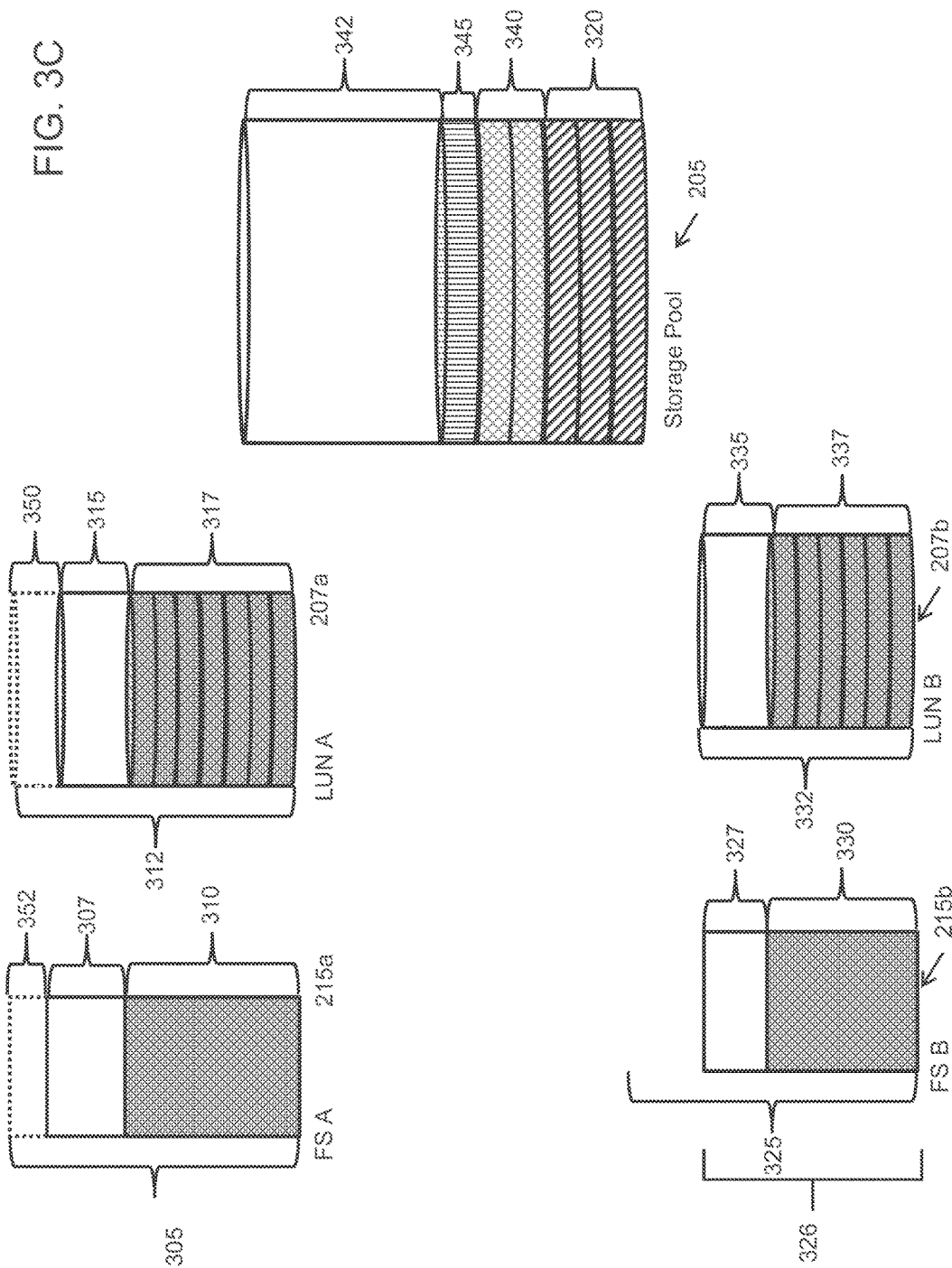

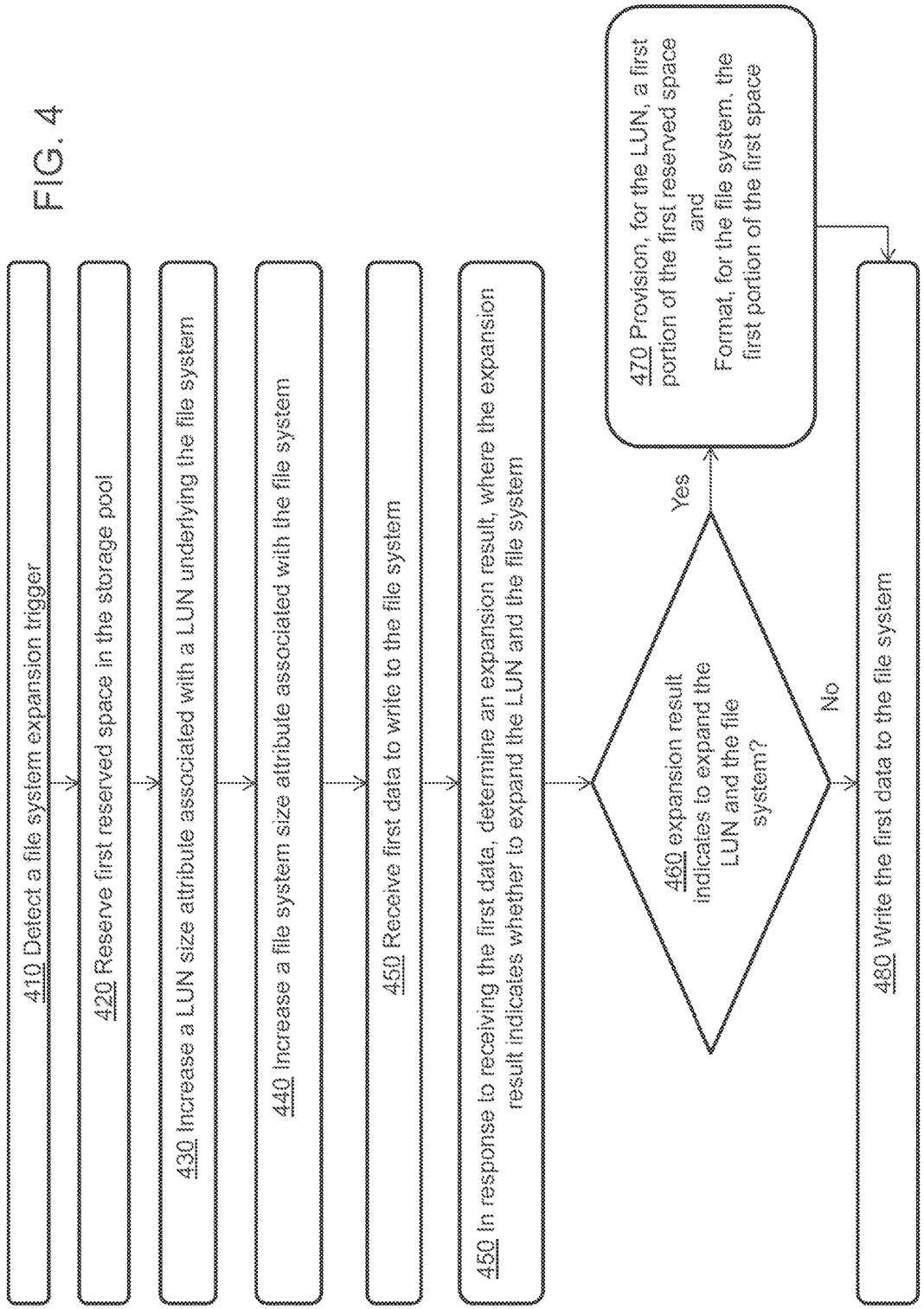

STORAGE POOL-BACKED FILE SYSTEM EXPANSION

FIELD OF THE TECHNOLOGY

The present technology relates generally to storage pool-backed file systems on a storage system and, more specifically, to expanding storage pool-backed file systems on a storage system.

BACKGROUND

Some storage systems can provide file systems (e.g., make file systems available to connected hosts to write to and/or read from). In some storage systems, a file system can be storage pool-backed. A storage pool can be formed from one or more hardware storage devices (e.g., hard drives, solid state drives, etc.). In forming the storage pool, the physical storage space on the respective hardware storage devices can be collectively pooled to provide storage space. In some storage systems, a storage pool-backed file system can be a file system that exists on a portion of the storage space in a storage pool.

Expanding a storage pool-backed file system (e.g., expanding the storage capacity of the file system) can require providing additional storage space to the file system from the storage pool, formatting the additional storage space, and adding the additional storage space to the file system so that it is usable for storing data. In some storage systems, these actions can be time-intensive and result in a reduction of system performance when executing.

SUMMARY OF THE TECHNOLOGY

Accordingly, there is a need for methods and systems to efficiently expand storage pool-backed file systems. Some embodiments of the technology described herein can improve the efficiency of expanding storage pool-backed file systems by, for example, delaying performance of time-intensive operations until additional storage space is actually needed and/or incrementally performing time-intensive operations as additional space is needed.

In one aspect, there is a method, performed by a storage system, of expanding a file system backed by a storage pool in the storage system. The method can include detecting, by the storage system, a file system expansion trigger. The method can include reserving, by the storage system, first reserved space in the storage pool, the storage pool including one or more hardware storage devices. The method can include increasing, by the storage system, a LUN size attribute associated with a LUN underlying the file system. The method can include increasing, by the storage system, a file system size attribute associated with the file system. The method can include receiving, by the storage system, first data to write to the file system. The method can include, in response to receiving the first data, determining, by the storage system, an expansion result, wherein the expansion result indicates whether to expand the LUN and the file system. The method can include, if the expansion result indicates to expand the LUN and the file system: provisioning, by the storage system, for the LUN, a first portion of the first reserved space; and formatting, by the storage system, for the file system, the first portion of the first reserved space. The method can include writing, by the storage system, the first data to the file system.

In some embodiments, detecting, by the storage system, the file system expansion trigger includes receiving, by the storage system, from a storage system management module, a command to expand the file system. In some embodiments, the file system is a thick file system. In some embodiments, detecting, by the storage system, the file system expansion trigger includes determining, by the storage system, that a utilization of the file system exceeds a pre-determined threshold. In some embodiments, the file system is a thin file system. In some embodiments, determining, by the storage system, the expansion result includes setting, by the storage system, the expansion result to indicate to expand the LUN and the file system if at least a portion of the first reserved space is required by the storage system to store the first data. In some embodiments, determining, by the storage system, the expansion result includes setting, by the storage system, the expansion result to indicate to expand the LUN and the file system if after storing the first data a utilization associated with the file systems will exceed a pre-determined threshold. In some embodiments, the method includes determining, by the storage system, a size of the first portion of the first space based on a size of the first data.

In another aspect, there is a storage system. The storage system can include a storage processor, and a plurality of hardware storage devices connected to the storage processor. The storage system can be configured to detect a file system expansion trigger; reserve first reserved space in the storage pool, the storage pool including one or more of the plurality of hardware storage devices; increase a LUN size attribute associated with a LUN underlying the file system; increase a file system size attribute associated with the file system; and receive first data to write to the file system. The storage system can be configured to, in response to receiving the first data, determine an expansion result, wherein the expansion result indicates whether to expand the LUN and the file system. The storage system can be configured to, if the expansion result indicates to expand the LUN and the file system: provision for the LUN, a first portion of the first reserved space and format for the file system, the first portion of the first reserved space. The storage system can be configured to write the first data to the file system.

In some embodiments, the storage processor is configured to detect the file system expansion trigger by receiving, from a storage system management module, a command to expand the file system. In some embodiments, the file system is a thick file system. In some embodiments, the storage processor is configured to detect the file system expansion trigger by determining that a utilization of the file system exceeds a pre-determined threshold. In some embodiments, the file system is a thin file system. In some embodiments, the storage processor is configured to determine the expansion result by setting the expansion result to indicate to expand the LUN and the file system if at least a portion of the first reserved space is required by the storage system to store the first data. In some embodiments, the storage processor is configured to determine the expansion result by setting the expansion result to indicate to expand the LUN and the file system if after storing the first data a utilization associated with the file systems will exceed a pre-determined threshold. In some embodiments, the storage processor is further configured to determine a size of the first portion of the first space based on a size of the first data.

In another aspect, there is a computer program product, tangibly embodied in a non-transitory computer readable storage medium. The computer program product can include instructions being operable to cause a storage system to: detect, by the storage system, a file system expansion trigger; reserve, by the storage system, first reserved space in the storage pool, the storage pool including one or more hardware storage devices; increase, by the storage system, a LUN size attribute associated with a LUN underlying the file system; increase, by the storage system, a file system size attribute associated with the file system; and receive, by the storage system, first data to write to the file system. The computer program product can include instructions being operable to cause the storage system to, in response to receiving the first data, determine, by the storage system, an expansion result, wherein the expansion result indicates whether to expand the LUN and the file system. The computer program product can include instructions being operable to cause a storage system to, if the expansion result indicates to expand the LUN and the file system: provision, by the storage system, for the LUN, a first portion of the first reserved space; and format, by the storage system, for the file system, the first portion of the first space. The computer program product can include instructions being operable to cause a storage system to write, by the storage system, the first data to the file system.

In some embodiments, the file system is a thick file system. In some embodiments, the file system is a thin file system. In some embodiments, the computer program product can include instructions being operable to cause a storage system to determine, by the storage system, a size of the first portion of the first space based on a size of the first data.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIG. 1 depicts a storage system, in accordance with the technology.

FIG. 2 depicts an exemplary logical relationship between hardware storage devices, a storage pool, LUNs, and file systems.

FIGS. 3A-3I depict logical views of file system A on LUN A, file system B on LUN B, and a storage pool.

FIG. 4 is a flow chart illustrating a method of expanding a storage pool-backed file system.

DETAILED DESCRIPTION

Figure 3B:
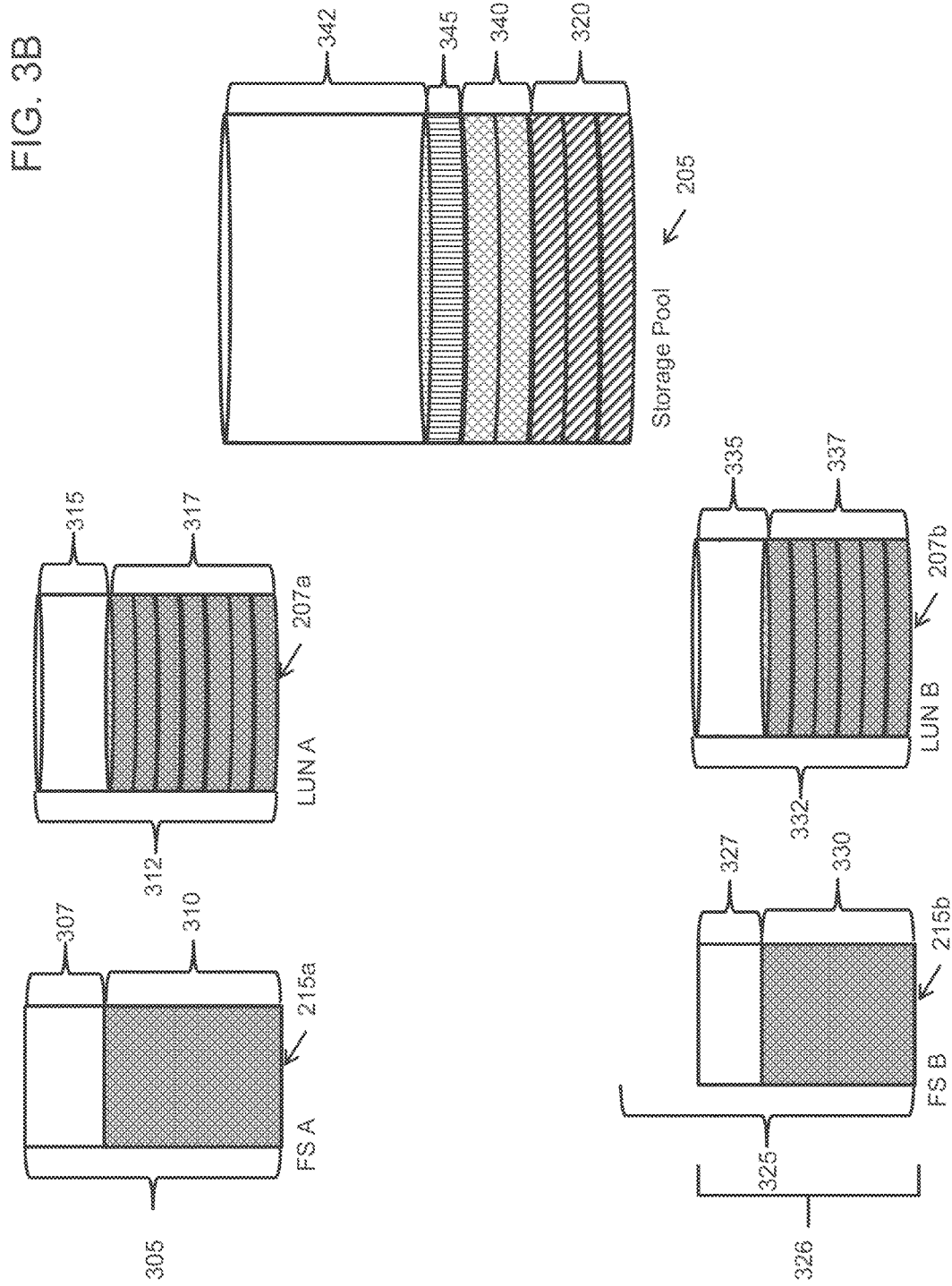

In some storage systems providing storage pool-backed file systems, expanding a file system involves provisioning large amounts of additional storage space from the storage pool and formatting the additional space for the file system at the time expansion is triggered, even if the additional storage space is not needed at that time for the file system to store data. Provisioning and formatting the additional storage space at the time the expansion is triggered can degrade storage system performance by, for example, causing delays when writing to the file system. Additionally, confirmation of the expansion to a user of the storage system can be delayed while the process completes. In some embodiments, the technology described herein can facilitate efficient operation of a storage system by delaying some of the time-cost associated with expanding storage pool-backed file systems until the additional storage space is actually needed for storing data. For example, the technology can provision and format storage space from a storage pool for the file system just-in-time as additional storage space is needed to store data.

In some embodiments of the technology, a storage system can provide a storage pool-backed file system. When the storage system detects a file system expansion trigger (e.g., a user attempts to manually increase the size of the file system or the storage system determines to automatically expand the file system based on the file system's utilization), the storage system can reserve additional storage space in the storage pool for the file system. The storage system can increase size attributes (e.g., variables) associated with the file system that indicate the size of the file system. The storage system can increase size attributes of any logical units (LUNs) or volumes underlying the file system that indicate the size of the underlying LUNs or volumes. Beneficially, reserving the storage space in the pool, increasing the size attributes of the file system, and increasing the size attributes of the file system's underlying LUNs or volumes (e.g., without also provisioning and formatting the reserved storage space from the storage pool for the file system) can be a low time-cost operation. The file system can appear to have been expanded with little time-cost when viewed from hosts and/or management consoles. At some later time, when the storage system receives data to write to the file system that will be written to the reserved space (e.g., when the existing provisioned and formatted space in the file system is insufficient to store the new data) the reserved space can be provisioned and formatted as needed. For example, the storage system can provision and format some or all of the reserved storage space to store the data being written to the file system.

Exemplary Storage System and Logical Environments

FIG. 1 depicts storage system 100, in accordance with the technology. Storage system 100 includes storage processor enclosure 105. Storage processor enclosure 105 can include one or more storage processors (not shown). The storage processors can be any computing devices, such as servers, blade servers, etc. Storage system 100 includes disk array enclosure 110 and disk array enclosure 115. Disk array enclosures 110 and 115 can include any form of storage devices, such as magnetic disk drives, flash memory drives, solid state drives, etc. In the illustrated embodiment, storage processor enclosure 105 is connected to disk array enclosure 110, which is connected to disk array enclosure 115. In illustrated storage system 100, the storage processors can read data from and write data to the storage devices in disk array enclosure 110 and disk array enclosure 115. Storage system 100 can be connected to management network 130. Storage system 100 can be connected to data networks 135. The illustrated connections can each be any type of connection for communicating data.

In general, the storage processors in storage processor enclosure 105 service IO requests (e.g., commands to read data from or write data to storage system 100) received from data networks 135. The storage processors in storage processor enclosure 105 can receive commands from management network 130 (e.g., commands to configure storage system 100 and/or provide information about the status of storage system 100). For example, commands from management network 130 can include commands to create storage pools from the storage devices in disk array enclosures 110 and 115 (or a portion thereof). Commands from management network 130 can include commands to create LUNs on storage pools on storage system 100. Commands from management network 130 can include commands to create file systems on storage system 100. In accordance with the technology described herein, commands from management network 130 can include commands to expand file systems that are backed by storage pools on storage system 100.

It should be appreciated that storage system 100 in FIG. 1 is an exemplary storage system in accordance with the technology. Other configurations are contemplated. For example, in some embodiments, the storage processors and disk enclosures can be in the same enclosure. In some embodiments, more or fewer disk array enclosures can be connected to the storage processors in the storage processor enclosure.

FIG. 2 depicts an exemplary logical relationship between hardware storage devices 202a-202f, storage pool 205, LUNs 207a and 207b, and file systems 215a and 215b. The illustrated logical relationship can be used to provide storage pool-backed file systems in a storage system. For example, storage devices 202a-202f can be located in disk array enclosure 110 and/or disk array enclosure 115 of storage system 100. Storage system 100 can include hardware, firmware, and/or software to implement the illustrated logical relationships. As illustrated in FIG. 2, storage pool 205 can be formed from hardware storage devices 202a-202f (e.g., physical storage devices). For example, the storage space of one or more of hardware storage devices 202a-202f can be added to storage pool 205, making the storage space from one or more of hardware storage devices 202a-202f available to be provisioned from storage pool 205. LUNs 207a and 207b can be formed on storage pool 205. For example, a portion of the storage space from storage pool 205 (which in turn is physical storage space from one or more of hardware storage devices 202a-202f) can be provisioned and/or assigned to LUN A 207a and a portion of the storage space from storage pool 205 (which in turn is storage space from one or more of hardware storage devices 202a-202f) can be provisioned and/or assigned to LUN B 207b. File systems 215a and 215b can be created on LUNs 207a and 207b. For example, a portion of the storage space from one or more of LUNs 207a and 207b can be assigned to file system (FS) A 215a, and a portion of the storage space from one or more of LUNs 207a and 207b can be assigned to FS B 215b. As another example, storage space from LUN A 207a can be assigned to FS A 215a, and storage space from LUN B 207b can be assigned to FS B 215b. Storage system 100 can maintain logical mappings between the address spaces of file systems 215a and 215b, LUNs 207a and 207b, and storage devices 202a-202f. In some embodiments, provisioning storage space in a storage pool for a LUN can include creating the mapping between the LUN's address space and the storage pool's address space. As an example of operation of storage system 100 providing the illustrated logical arrangement, if a host writes data to FS A 215a to be stored at a logical address on LUN A 207a, the data can be stored on portions of hardware storage devices 202a-202f that are assigned to LUN A 207a via storage pool 205 and map to the logical address.

It should be appreciated that logical relationships illustrated in FIG. 2 are exemplary logical relationships in accordance with the technology. Other relationships are contemplated. For example, one or more additional layers of virtualization and/or abstraction can be utilized by a storage system in providing storage pool-backed file systems. In some storage system a LUN can be referred to as a logical volume and/or logical disk volume.

File System Expansion

As discussed herein, the technology can facilitate efficient expansion of storage pool-backed file systems. FIGS. 3A-3I depict logical views of file system A 215a on LUN A 207a, file system B 215b on LUN B 207b, and storage pool 205.

FIGS. 3A-3I illustrate in sequence the expansion of FS A 215a and FS B 215b in accordance with some embodiments of the technology. In the illustrated embodiment, FS A 215a has file system size attribute 305 (graphically represented as a bracket). File system size attribute 305 can be a variable associated with FS A 215a that indicates the size of FS A 215a. For example, file system size attribute 305 can be the total number of bytes of FS A 215a (e.g., a host using FS A 215a can see file system size attribute 305 as the size of FS A 215a). FS A 215a has free space 307 (e.g., storage space in which data is not stored) and used space 310 (e.g., space in which data is stored). As illustrated, LUN A 207a underlies FS A 215a. LUN A 207A has LUN size attribute 312 (graphically represented as a bracket). LUN size attribute 312 can be a variable associated with LUN A 207a that indicates the size of LUN A 207a. LUN A 207a has free space 315 (e.g., free space approximately corresponding to free space 307) and used space 317 (e.g., approximately corresponding to used space 310). LUN A 207a consists of storage space 320 from storage pool 205. Storage space 320 provides the storage space for LUN A 207a and, in turn, FS A 215a (e.g., storage space 320 comprises physical storage space from one or more of storage devices 202a-202f). In the illustrated embodiment, storage space 320 has been provisioned to LUN A 207A, and free space 307 and used space 310 of FS A 215a have been formatted. In some applications, FS A 215a can be referred to as a thick file system, for example, because storage space in storage pool 205 has been assigned to provide storage for a file system of file system size attribute 305.

FS B 215b has total file system size attribute 325 (graphically represented as a bracket). Total file system size attribute 325 can be a variable associated with FS B 215b that indicates the total size of FS B 215b. For example, total file system size attribute 325 can be the total number of bytes of FS B 215b (e.g., a host using FS B 215b can see total file system size attribute 325 as the size of FS B 215b). FS B 215b has file system size attribute 326. File system size attribute 326 can be a variable associated with FS B 215b that indicates the actual size of FS B 215b. For example, file system size attribute 326 can be the total number of bytes of physical storage that has been assigned to FS B 215b. FS B 215b has free space 327 (e.g., storage space in which data is not stored) and used space 330 (e.g., space in which data is stored). As illustrated, LUN B 207b underlies FS B 215b. LUN B 207b has LUN size attribute 332 (graphically represented as a bracket). LUN size attribute 332 can be a variable associated with LUN B 207b that indicates the size of LUN B 207b. LUN B 207b has free space 335 (e.g., free space approximately corresponding to free space 327) and used space 337 (e.g., approximately corresponding to used space 330). LUN B 207b consists of storage space 340 from storage pool 205. Storage space 340 provides the storage space for LUN B 207b and, in turn, FS B 215b (e.g., storage space 340 comprises physical storage space from one or more of storage devices 202a-202f). In the illustrated embodiment, storage space 340 has been provisioned to LUN B 207b, and free space 327 and used space 330 of FS B 215b have been formatted. In some applications, FS B 215b can be referred to as a thin file system, for example, because storage space in storage pool 205 has been assigned to provide storage for free space 327 and used space 330 (e.g., storage space the size of file system size attribute 326), but storage space sufficient for a file system of total file system size attribute 325 has not been assigned.

Referring to FIG. 3B, when storage system 100 receives a file system expansion trigger to expand FS A 215a (e.g., a command to expand FS A 215a received via management network 130), storage system 100 reserves storage space 345 in storage pool 205 for LUN A 207a. For example, reserving storage space 345 can ensure storage system 100 does not provision or reserve storage space 345 for another LUN. As illustrated by the vertical hashing, storage space 345 is not yet provisioned to LUN A. Referring to FIG. 3C, LUN size attribute 312 is increased by additional space 350 to reflect reserved storage space 345. Since storage space 345 has been reserved, but not provisioned, there is no mapped storage for additional space 350 in storage pool 205 (e.g., addresses in additional space 350 are not mapped to any addresses in storage space 345). File system size attribute 305 is increased by additional space 352 to reflect the increased LUN size attribute 312. Additional space 352 is not formatted because underlying LUN A 207a has not been provisioned storage space for additional space 350.

Figure 3D:
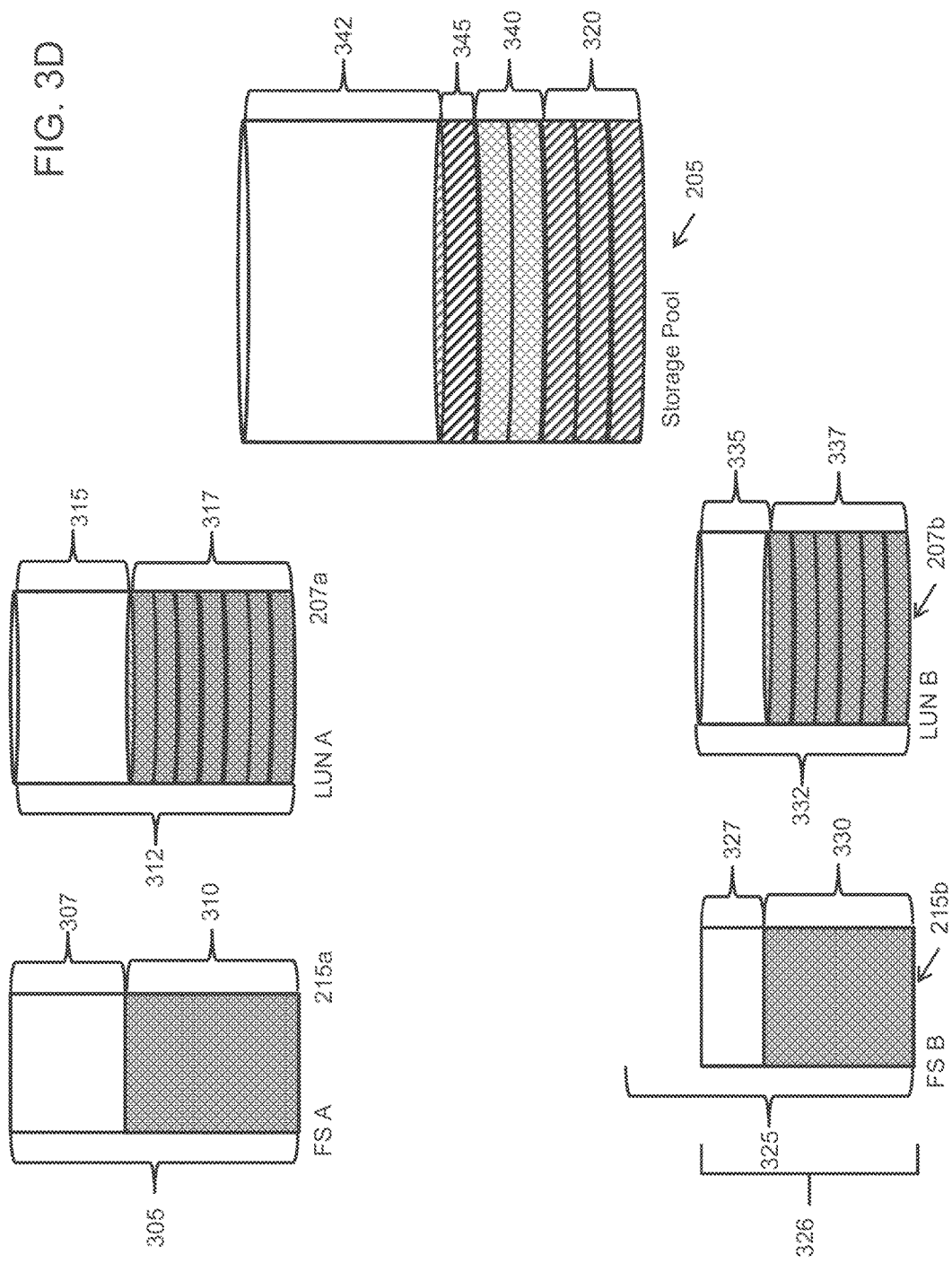
Figure 3E:
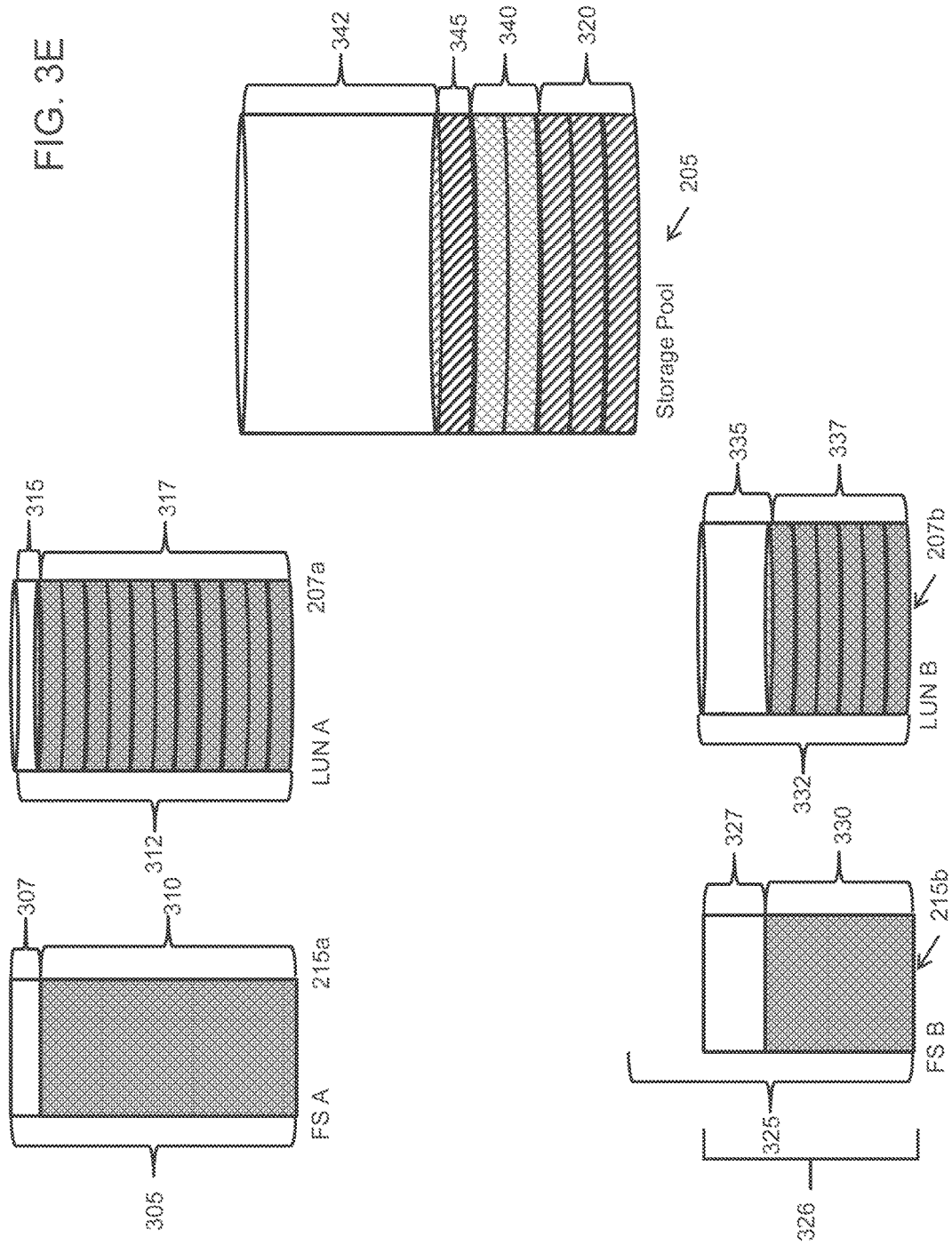

In some embodiments, storage pool 205, LUN A 207a, and FS A 215a can remain in the state illustrated in FIG. 3C until storage system 100 receives data to write to FS A 215a that would require writing data to additional space 352 (e.g., storage system 100 receives new data to write to FS A 215a that requires more space than is available in free space 307). As illustrated in FIG. 3D, after receiving such data, storage system 100 provisions storage space 345 for LUN A 207a (as indicated by the angled hashing), increasing free space 315 in LUN A 207a by the size of additional space 350. Storage system 100 formats additional space 352 for FS A 215a, increasing free space 307 by the size of additional space 352. Referring to FIG. 3E, the data is written to FS A 215a, increasing used space 310. Similarly, used space 317 of LUN A 207a is increased. In some embodiments, reserved storage space 345 can be provisioned at approximately the same time. In some embodiments, portions of reserved space 345 (e.g., 250 megabyte portions) can be provisioned based on the amount of additional storage space needed required to store data in FS A 215a.

Figure 3F:
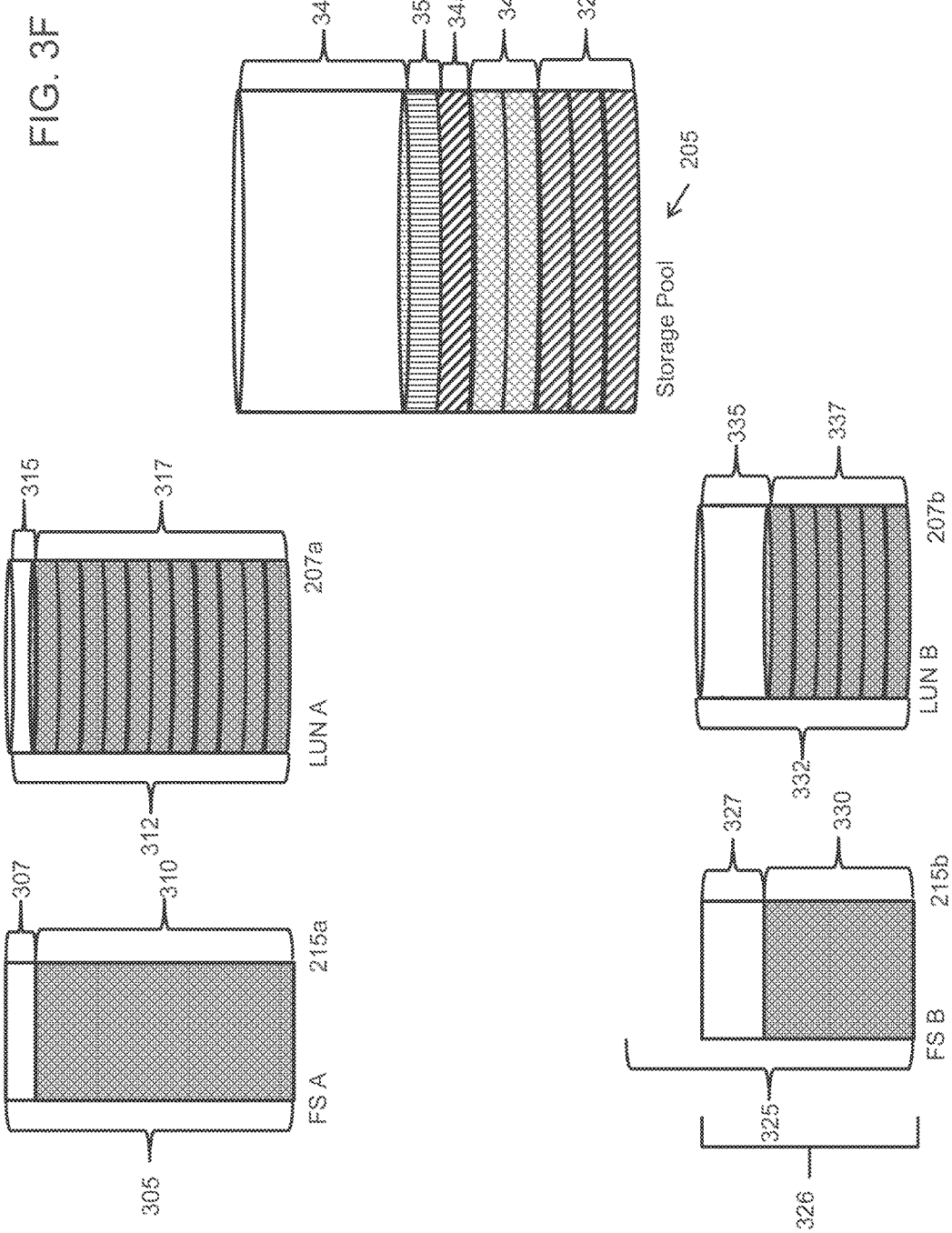
Figure 3G:
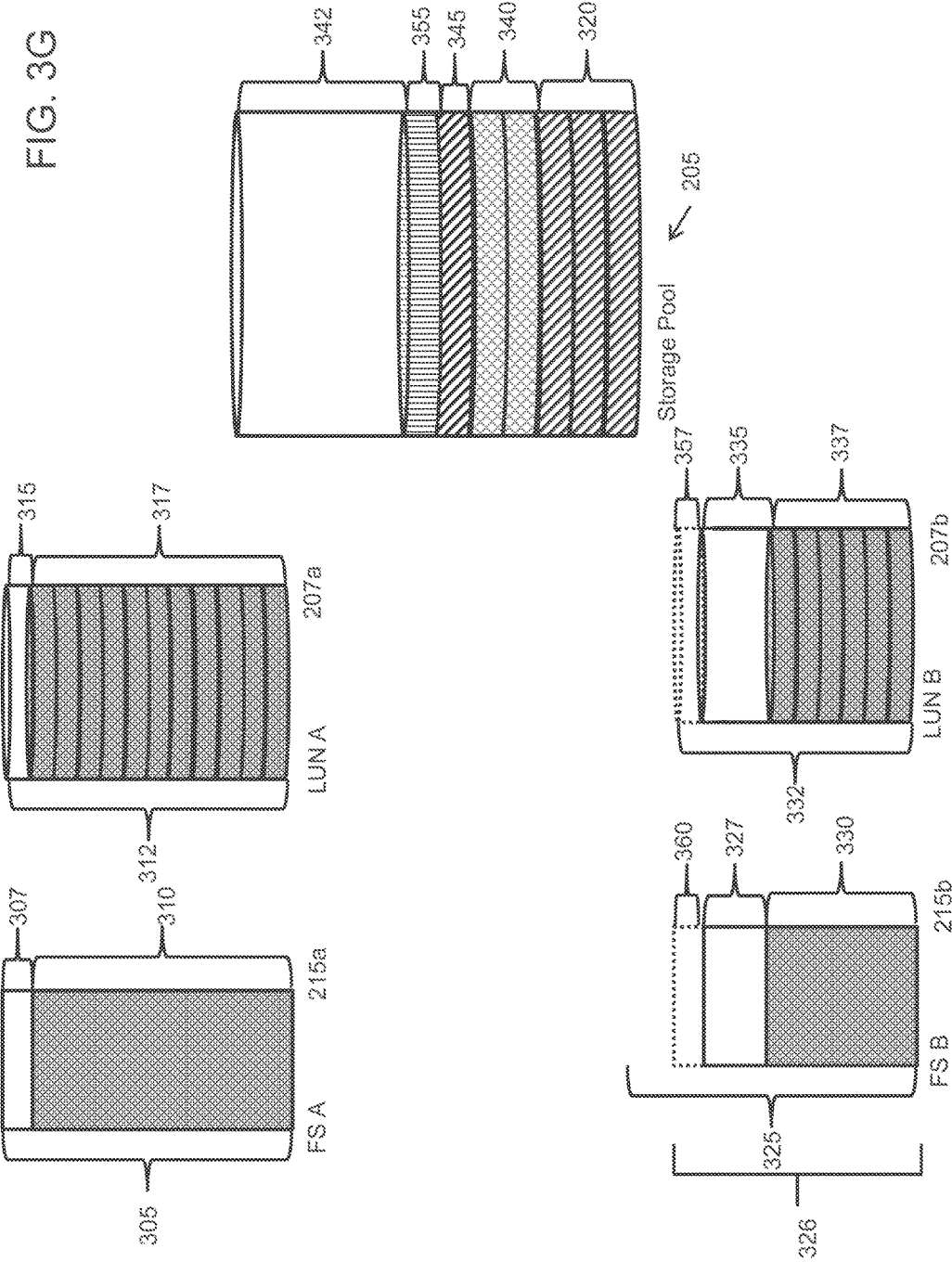

Expansion of file system FS B 215b can be similar to the illustrated expansion of FS A 215a. Referring to FIG. 3F, when storage system 100 receives a file system expansion trigger to expand FS B 215b (e.g., upon storage system 100 detecting that a size of used space 330 exceeds a predetermined threshold percentage of file system size attribute 326), storage system 100 reserves storage space 355 in storage pool 205 for LUN B 207b. For example, reserving storage space 355 can ensure storage system 100 does not provision or reserve storage space 355 for another LUN. As illustrated by the vertical hashing, storage space 355 is not yet provisioned to LUN B 207b. Referring to FIG. 3G, LUN size attribute 332 is increased by additional space 357 to reflect reserved storage space 355. Since storage space 355 has been reserved, but not provisioned, there is no mapped storage for additional space 357 in storage pool 205 (e.g., addresses in additional space 357 are not mapped to any addresses in storage space 355). File system size attribute 326 is increased by additional space 360 to reflect the increased LUN size attribute 332. Additional space 360 is not formatted because underlying LUN B 207b has not been provisioned storage space for additional space 350.

Figure 3H:
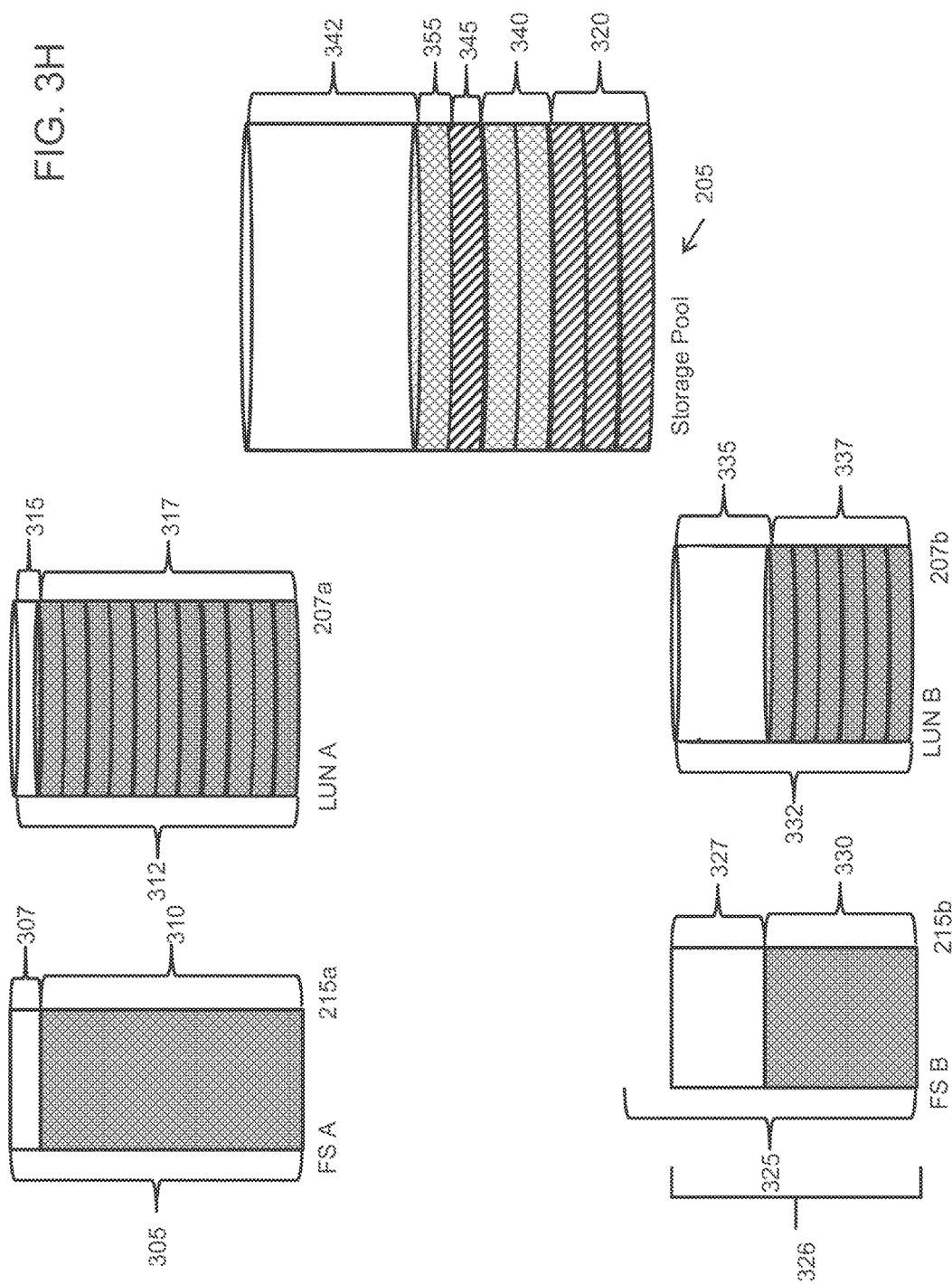
Figure 3I:
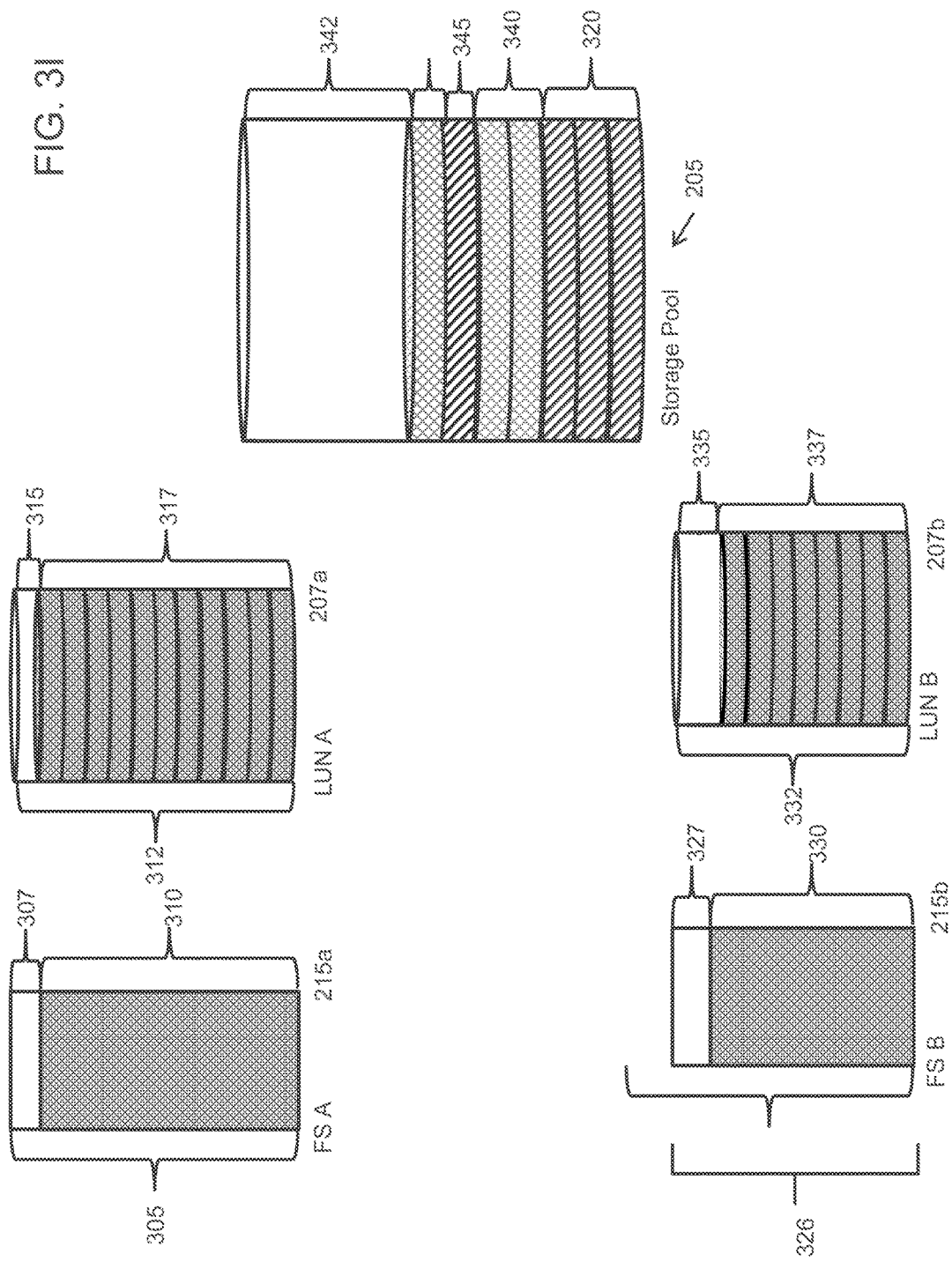

In some embodiments, storage pool 205, LUN B 207b, and FS B 215b can remain in the state illustrated in FIG. 3G until storage system 100 receives data to write to FS B 215b that would require writing data to additional space 360 (e.g., storage system 100 receives new data to write to FS B 215b that requires more space than is available in free space 327). As illustrated in FIG. 3H, after receiving such data, storage system 100 provisions storage space 355 for LUN B 207b (as indicated by the crossed hashing), increasing free space 335 in LUN B 207b by the size of additional space 357. Storage system 100 formats additional space 360 for FS B 215b, increasing free space 327 by the size of additional space 352. Referring to FIG. 3I, the data is written to FS B 215b, increasing used space 330. Similarly, used space 337 of LUN B 207b is increased. In some embodiments, reserved storage space 355 can be provisioned at approximately the same time. In some embodiments, portions of reserved space 345 (e.g., 250 megabyte portions) can be provisioned based on the amount of additional storage space needed required to store data in FS B 215b.

FIG. 4 is a flow chart illustrating a method of expanding a storage pool-backed file system. At step 410, a storage system detects a file system expansion trigger. A file system expansion trigger can be any command received by the storage system or state detected by the storage system that causes the storage system to expand the file system. For example, as described above with respect to FIGS. 3B and 3F, a file system expansion trigger can be a received command to expand the file system or the storage system detecting that the utilization of the file system exceeds a predetermined threshold. At step 420, the storage system reserves first reserved space in the storage pool. For example, as described above with respect to FIGS. 3B and 3F, storage space 345 and/or storage space 355 can be reserved in storage pool 205. At step 430, the storage system increases a LUN size attribute associated with a LUN underlying the file system. For example, as described above with respect to FIGS. 3C and 3G, LUN size attribute 312 and/or LUN size attribute 332 can be increased (e.g., in an amount associated with the size of the reserved storage space). At step 440, the storage system increases a file system size attribute associated with the file system. For example, as described above with respect to FIGS. 3C and 3G, file system size attribute 305 and/or file system size attribute 326 can be increased.

At step 450, the storage system receives first data to write to the file system. For example, the storage system can receive data to store in the files system. At step 450, in response to receiving the first data, the file system determines an expansion result, where the expansion result indicates whether to expand the LUN and the file system. In some embodiments, the file system can determine an expansion result that indicates to expand the LUN and file system if there is insufficient storage space in the file system to store the first data. In some embodiments, the file system can determine an expansion result that indicates to expand the LUN and file system if storing the first data will cause the file system's utilization to exceed a predetermined threshold. At step 460, the storage system determines whether the expansion result indicates to expand the LUN and the file system. If the expansion result indicates to expand the LUN and the file system, the method proceeds to step 470. At step 470, the storage system provisions, for the LUN, a first portion of the first reserved space and formats for the file system, the first portion of the first space. For example, as described above with respect to FIGS. 3D and 3H, storage space is provisioned for additional space 350 and/or additional space 357, and additional space 352 and/or additional space 360 is formatted. The method then proceeds to step 480. If the expansion result does not indicate to expand the LUN and the file system, the method proceeds to step 480. At step 480, the storage system writes the first data to the file system.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method, performed by a storage system, of expanding a file system backed by a storage pool in the storage system, the method comprising:
    detecting, by the storage system, a file system expansion trigger to expand the file system, the file system being created on a LUN, the LUN underlying the file system;
    having detected the file system expansion trigger, reserving, by the storage system, first reserved space in the storage pool for the LUN, the storage pool comprising one or more hardware storage devices, wherein the first reserved space is not yet provisioned to the LUN;
    increasing, by the storage system, a LUN size attribute associated with the LUN underlying the file system, the LUN size attribute being increased by first additional space to reflect the first reserved space reserved in the storage pool for the LUN; wherein increasing, by the storage system, the LUN size attribute associated with the LUN underlying the file system includes increasing the LUN size attribute by the first additional space without mapping addresses in the first additional space to any addresses in the first reserved space in the storage pool;
    increasing, by the storage system, a file system size attribute associated with the file system by second additional space to reflect the increased LUN size attribute associated with the LUN underlying the file system; wherein increasing, by the storage system, the file system size attribute associated with the file system includes increasing the file system size attribute by the second additional space without formatting the second additional space;
    receiving, by the storage system, first data to write to the file system;
    in response to receiving the first data, determining, by the storage system, an expansion result, wherein the expansion result indicates whether to expand the LUN and the file system; and if the expansion result indicates to expand the LUN and the file system:
    provisioning, by the storage system, to the LUN, a first portion of the first reserved space reserved in the storage pool for the LUN;
    having provisioned the first portion of the first reserved space to the LUN, formatting, by the storage system, for the file system, the first portion of the first reserved space reserved in the storage pool for the LUN; and
    writing, by the storage system, the first data to the file system.

2. The method of claim 1, wherein detecting, by the storage system, the file system expansion trigger comprises: receiving, by the storage system, from a storage system management module, a command to expand the file system.

3. The method of claim 2, wherein the file system is a thick file system.

4. The method of claim 1, wherein detecting, by the storage system, the file system expansion trigger comprises: determining, by the storage system, that a utilization of the file system exceeds a pre-determined threshold.

5. The method of claim 4, wherein the file system is a thin file system.

6. The method of claim 1, wherein determining, by the storage system, the expansion result comprises: setting, by the storage system, the expansion result to indicate to expand the LUN and the file system if at least the first portion of the first reserved space is required by the storage system to store the first data.

7. The method of claim 1, wherein determining, by the storage system, the expansion result comprises: setting, by the storage system, the expansion result to indicate to expand the LUN and the file system if after storing the first data a utilization associated with the file systems will exceed a pre-determined threshold.

8. The method of claim 1, further comprising: determining, by the storage system, a size of the first portion of the first space based on a size of the first data.

9. A storage system comprising:
a storage processor; and
a plurality of hardware storage devices connected to the storage processor, wherein the storage processor is configured to:
detect a file system expansion trigger to expand a file system, the file system being created on a LUN, the LUN underlying the file system;
having detected the file system expansion trigger,
reserve first reserved space in the storage pool for the LUN, the storage pool comprising one or more of the plurality of hardware storage devices, wherein the first reserved space is not yet provisioned to the LUN;
increase a LUN size attribute associated with the LUN underlying the file system, the LUN size attribute being increased by first additional space to reflect the first reserved space reserved in the storage pool for the LUN; wherein increase, by the storage system, the LUN size attribute associated with the LUN underlying the file system includes increasing the LUN size attribute by the first additional space without mapping addresses in the first additional space to any addresses in the first reserved space in the storage pool;
increase a file system size attribute associated with the file system by second additional space to reflect the increased LUN size attribute associated with the LUN underlying the file system; wherein increase, by the storage system, the file system size attribute associated with the file system includes increasing the file system size attribute by the second additional space without formatting the second additional space;
receive first data to write to the file system; in response to receiving the first data, determine art expansion result, wherein the expansion result indicates whether to expand the LUN and the file system; and
if the expansion result indicates to expand the LUN and the file system:
provision to the LUN, a first portion of the first reserved space reserved in the storage pool for the LUN;
having provisioned the first portion of the first reserved space to the LUN,
format for the file system, the first portion of the first reserved space reserved in the storage pool for the LUN; and
write the first data to the file system.

10. The storage system of claim 9, wherein the storage processor is configured to detect the file system expansion trigger by receiving, from a storage system management module, a command to expand the file system.

11. The storage system of claim 10, wherein the file system is a thick file system.

12. The storage system of claim 9, wherein the storage processor is configured to detect the file system expansion trigger by determining that a utilization of the file system exceeds a pre-determined threshold.

13. The storage system of claim 12, wherein the file system is a thin file system.

14. The storage system of claim 9, wherein the storage processor is configured to determine the expansion result by setting the expansion result to indicate to expand the LUN and the file system if at least the first portion of the first reserved space is required by the storage system to store the first data.

15. The storage system of claim 9, wherein the storage processor is configured to determine the expansion result by setting the expansion result to indicate to expand the LUN and the file system if after storing the first data a utilization associated with the file systems will exceed a pre-determined threshold.

16. The storage system of claim 9, wherein the storage processor is further configured to: determine a size of the first portion of the first space based on a size of the first data.

17. A computer program product, tangibly embodied in a non-transitory computer readable storage medium, including instructions being operable to cause a storage system to:
detect, by the storage system, a file system expansion trigger to expand a file system, the file system being created on a LUN, the LUN underlying the file system;
having detected the file system expansion trigger,
reserve, by the storage system, first reserved space in the storage pool for the LUN, the storage pool comprising one or more hardware storage devices, wherein the first reserved space is not yet provisioned to the LUN;
increase, by the storage system, a LUN size attribute associated with a the LUN underlying the file system, the LUN size attribute being increased by first additional space to reflect the first reserved space reserved in the storage pool for the LUN; wherein increase, by the storage system, the LUN size attribute associated with the LUN underlying the file system includes increasing the LUN size attribute by the first additional space without mapping addresses in the first additional space to any addresses in the first reserved space in the storage pool;
increase, by the storage system, a file system size attribute associated with the file system by second additional space to reflect the increased LUN size attribute associated with the LUN underlying the file system; wherein increase, by the storage system, the file system size attribute associated with the file system includes increasing the file system size attribute by the second additional space without formatting the second additional space;
receive, by the storage system, first data to write to the file system;
in response to receiving the first data, determine, by the storage system, an expansion result, wherein the expansion result indicates whether to expand the LUN and the file system; and if the expansion result indicates to expand the LUN and the file system:
provision, by the storage system, to the LUN, a first portion of the first reserved space reserved in the storage pool for the LUN;
having provisioned the first portion of the first reserved space to the LUN, format, by the storage system, for the file system, the first portion of the first space reserved in the storage pool for the LUN; and write, by the storage system, the first data to the file system.

18. The computer program product of claim 17, wherein the file system is a thick file system.

19. The computer program product of claim 17, wherein the file system is a thin file system.

20. The computer program product of claim 17, further comprising instructions being operable to cause a storage system to:

determine, by the storage system, a size of the first portion of the first space based on a size of the first data.

21. The method of claim 1, further comprising:

delaying (i) the mapping of the addresses in the first additional space to the addresses in the first reserved space in the storage pool, and (ii) the formatting of the second additional space, until the expansion result indicates to expand the LUN and the file system.

* * * * *